United States Patent [19]

Dietrich et al.

[11] Patent Number: 4,721,384

[45] Date of Patent: Jan. 26, 1988

[54] OPTICAL-ELECTRONIC RANGEFINDER

[75] Inventors: Johannes Dietrich, Gilching; Bernd Hartmann, Schwifting, both of Fed. Rep. of Germany

[73] Assignee: Deutsche Forschungs- und Versuchsanstalt für Luft- und Raumfahrt E.V., Bonn, Fed. Rep. of Germany

[21] Appl. No.: 822,870

[22] Filed: Jan. 27, 1986

[30] Foreign Application Priority Data

Jan. 26, 1985 [DE] Fed. Rep. of Germany ....... 3502634

[51] Int. Cl.$^4$ .......................... G01C 3/00; G01C 5/00; G03B 3/00; G03B 13/18
[52] U.S. Cl. ............................................ 356/1; 356/4; 354/403
[58] Field of Search .......................... 356/1, 4, 5, 376; 354/403

[56] References Cited

U.S. PATENT DOCUMENTS

| | | | |
|---|---|---|---|
| 4,053,227 | 10/1977 | Bodlaj | 356/1 |
| 4,199,253 | 4/1980 | Ross | 356/5 |
| 4,289,397 | 9/1981 | Stzkan et al. | 356/5 |
| 4,497,560 | 2/1985 | Nagaoka et al. | 354/403 |
| 4,527,892 | 7/1985 | Yamane et al. | 356/1 |
| 4,582,424 | 4/1986 | Kawabata | 356/1 |
| 4,601,574 | 7/1986 | Yamane et al. | 354/403 |
| 4,606,629 | 8/1986 | Hines et al. | 356/1 |

Primary Examiner—Stephen C. Buczinski
Assistant Examiner—Melissa L. Koltak
Attorney, Agent, or Firm—Collard, Roe & Galgano

[57] ABSTRACT

There is provided by the present invention an optical-electronic rangefinder having a housing adapted to be integrated in the gripping arm or mechanism of a robot and housing a light transmitter transmitting a well focussed high intensity light beam, a light receiver having a position detector, a pulse-electronic circuit for controlling the light transmitter and an amplifier circuit for transforming the currents received from the position detector into proportional voltages. The light transmitter and light receiver are so disposed with respect to each other that the central axis of the light transmitter and the optical axis of the light receiver define a predetermined acute angle between each other.

14 Claims, 10 Drawing Figures

OPTICAL-ELECTRONIC RANGEFINDER

The present invention relates to an optical-electronic rangefinder adapted for mounting on the gripping arm or gripping mechanism of a robot.

No rangefinding systems are presently known or available which are designed and built small enough for direct mounting on or within the gripping arm or gripping mechanism of a robot and by means of which ranges or distances of up to about 500 mm can be measured in a number of directions without contact.

It is, therefore, an object of the present invention to provide an optical-electronic rangefinder having especially small dimensions permitting it to be mounted in various designs, for example on the gripping arm or mechanism of a robot or robot tool or accommodated within such a robot gripping arm or tool, and by means of which rangefinder the surfaces or tools of any shape and orientation can be approached rapidly and in a controlled manner, so that ranges can be measured with a high degree of accuracy and measuring frequency within a wide range of measurement in a contactless manner and with locally fine differentiation combined with high resolution.

This object is accomplished in accordance with the present invention by the provision of an optical-electronic rangefinder having a housing adapted to be integrated in the gripping arm or mechanism of a robot and housing a light transmitter transmitting a well focussed high intensity light beam, a light receiver having a position detector, a pulse-electronic circuit for controlling the light transmitter and an amplifier circuit for transforming the currents received from the position detector into proportional voltages. The light transmitter and light receiver are so disposed with respect to each other that the central axis of the light transmitter and the optical axis of the light receiver define a predetermined acute angle between each other.

Since the sensor equipment of the optical-electronic rangefinder of the present invention can be accommodated in the gripper arm of a robot or even integrated in such an arm, ranges can be measured without contact from the gripper arm in a number of directions. This means that with the use of such a rangefinder, the range of application of robots and also the speed of such robots can be significantly broadened and increased, respectively.

In one embodiment of the invention, the light transmitter transmitting a beam of light of high intensity is, for example, a GaAlAs light-emitting diode, whose beam of light is focussed. By providing a shutter or aperture near the light-emitting diode for preventing the emission of radiation which is not directly generated by the crystal of the light-emitting diode, a small and sharply defined light spot is obtained on the surface of the object to be measured. Furthermore, another shutter or aperture is provided directly on the focussing lens, assuring the formation of a small light beam diameter within the proximity of the light transmitter.

Preferably, the light transmitter is provided in the form of a GaAlAs-CW laser diode having a photo diode optically coupled thereto. For focussing the divergent radiation transmitted by the laser diode, a highly refractive microlens with a short focal length is after-connected to the laser diode, and several shutters or apertures are arranged in front of or ahead of the lens as radiation traps for the purpose of reducing the emission of undesirable unfocussed radiation generated by dispersion on the surfaces penetrated by the radiation. By designing the light transmitter in this way it is possible to produce an approximately parallel beam with a minimal divergence of about 1 to 2 m rad and a very small diameter (in the order of magnitude of 0.5 to 1 mm), so that the use or application of this light transmitter in practical terms permits a very fine local differentiation in the rangefinding process.

According to another preferred embodiment of the invention, the light receiver is a unidimensionally measuring, small position detector having an optical area measuring only about 5 mm $\times$ 2 mm, i.e. 10 mm$^2$, with a biconvex lens or a lens system correcting the error in the opening angle arranged in front of the position detector. By inclining the surface of the detector with respect to the optical axis of the lens or lens system, the sharpest possible reproduction of the light spot on the detector surface and thus on the detector is achieved irrespective of the distance of a scattered light spot. In order to permit a large adjustment of the measuring range of the optical-electronic rangefinder, the position-sensitive detector is mounted in the light receiver on the computed, inclined plane in such a way that it can be mechanically displaced.

For forming two rangefinding systems disposed parallel to each other, the invention provides for arranging two light transmitters symmetrically with respect to the center axis of one common detector element. Each light transmitter is associated with a lens system disposed at a corresponding angle for sharply reproducing the rays reflected by the surface of the object. With such an arrangement it is also possible to detect the angle relative to the surface to be measured. Even this sensor with two parallel rangefinding systems can be readily accommodated either directly in the gripping arm of a robot or near to the gripping mechanism.

According to another embodiment of the invention, the above-described measuring arrangement of two light transmitters and one light receiver may be doubled. In the latter case, the two arrangements are disposed at an angle of 90° relative to each other. Such an arrangement is suitable for a measuring range of from about 0 to 25 mm and for direct integration in the gripping jaws of a robot arm. With this embodiment, all electronic equipment for controlling the light-emitting diodes used in the light transmitter as well as the amplifiers required for the operation of the rangefinder may be accommodated in a common housing and thus in the jaw of the gripping mechanism.

With robot grippers in which these rangefinding arrangements are integrated in the jaws of the gripping mechanism, a total of eight measuring beams or rays are utilized in determining ranges. By means of the present invention, robots are capable of rapid and accurately controlled access to objects without requiring image detection systems for these objects. In particular, no problems are encountered because of physical interference or hidden areas since the sensors are disposed within the moving gripping mechanism of the robot itself.

Furthermore, to increase the output especially of the laser diode, a control circuit consisting of a difference amplifier and a field-effect-transistor after-connected to the amplifier is provided in the housing of the light transmitter. By means of such control, it is possible to control the flow of current through the laser diode so finely that a highly dynamic control operation with stability in all operating ranges results.

Furthermore, according to the invention, a nonlinear counter-coupling circuit is provided for stabilizing the output of the laser diode which is designed such that the laser diode, which operates in a pulsed mode, operates with stability and especially with short transient periods at very low outputs, and without leading to surges or permanent variations in the presence of high outputs.

Finally, according to another advantageous feature of the invention, a circuit arrangement is provided for processing the signal of currents at the output of a light receiver of an optical-electronic rangefinder, by means of which circuit arrangement the two currents discharged by the position-sensitive detector are converted and processed in two identical, but separate channels so that two voltages are applied to the outputs of the channels for further processing which are free from any interference light proportions.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

Figure 1:
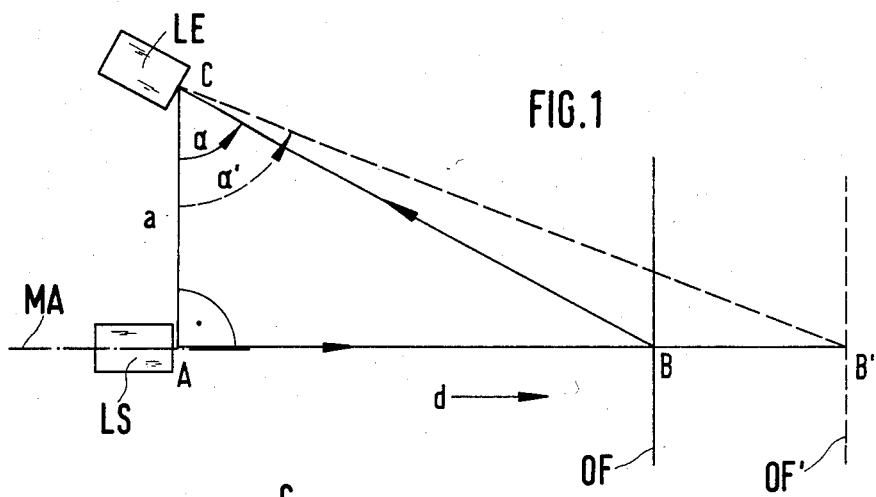
FIG. 1 is a schematic representation in principle of the arrangement of a light transmitter and a light receiver in the optical-electronic rangefinder according to the present invention.

Now turning to the drawings, there is shown in FIG. 1 a schematic representation of the functional principle of the proposed range finder and the arrangement in principle of a light transmitter and a light receiver. The proposed range finder functions as a sensor using a geometric-optical measuring method, which is called Triangulation. Using this method, the measurement of a distance or length is replaced by the determination of an angle. Based on this, the required accuracy within the desired measuring range of 500 mm can be achieved. Thus, a light transmitter LS and a light receiver LE are arranged at a base distance "a" from each other. The light transmitter LS, positioned at A, is used to project a light point at B or B' on the indicated surface OF or OF', respectively, by means of a light beam having the smallest possible diameter. The rays are scattered back, reflected and absorbed according to the optical properties of the respective surface.

Figure 4:
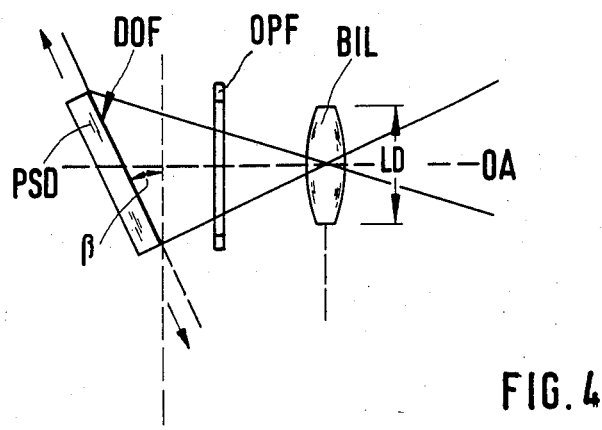
FIG. 4 is a schematic representation in principle of the arrangement of a light receiver comprised of a detector and an aligned lens or lens system.

A part of the light returning from surface OF or OF' strikes light receiver LE situated at C. The rays returning to the light receiver are focused using a lens or lens system and represented as a small point on the surface DOF of a so called linear position-sensitive-detector PSD (see FIG. 4). The position of the light point is determined by the signals from the detector PSD. This is used together with the geometric system parameters to calculate the distance d to the surface OF or OF'.

The relationship between the distance d, from the object surface OF to the light transmitter LS, and the angle $\alpha$, the angle between the line "a" joining light transmitter LS and light receiver LE and the light beam returning from the object surface OF, can be described by the following equation:

$$d = a.\tan\alpha$$

Figure 2:
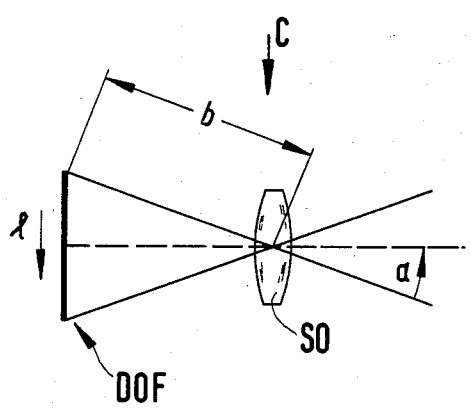
FIG. 2 is a schematic representation in principle of the design of a functional light receiver according to the present invention.

The angle $\alpha$ is here indirectly measured. In the light receiver LE at C is arranged for example a pinhole (not shown in detail) or a lens or lens system (SO in FIG. 2) through which the light returning from object surface OF is focused on position detector PSD (FIG. 4) situated in light receiver LE. Through this the position $l$ of the projected light on the detector surface DOF is represented using the angle $\alpha$ as follows:

$$l = b.\sin\alpha$$

where b is a parameter which represents the distance between the pinhole or the mid-point of the lens or lens system, and the detector surface.

A high-intensity light beam, as sharply focused as possible, must be generated by the light transmitter LS, so that the distance to poorly reflecting and/or slanting surfaces can also be measured with a high spatial resolution. A special light-emitting-diode LED is suitable for this purpose, in particular a GaAlAs-light-emitting-diode, which is for example offered by the firm Hitachi under the serial numbers HLPXXR. Such light-emitting-diodes generate a very powerful light for a small emitting area, due to their construction and the geometric shape of their light emitting parts. In addition, the light power can be increased approximately tenfold by pulsing.

Figure 3A:
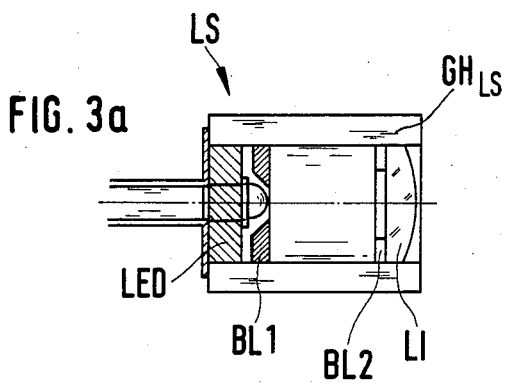
FIG. 3a is an enlarged schematic representation of a light transmitter according to the present invention.

The construction of a light transmitter LS is shown in FIG. 3a. A light-emitting-diode LED is at one end (left end in FIG. 3), and a plano-convex lens LI, or appropriate lens system at the other end (right end in FIG. 3) of a preferably cylindrical housing $GH_{LS}$ made of aluminum. The beam from the light-emitting-diode LED is focused by the plano-convex lens LI. An aperture BL1 is positioned between light-emitting-diode LED and lens LI, close to the LED, which prevents the emission of light not coming directly from the LED crystal. The addition of aperture BL1 is necessary to maintain a sharp light spot on the measuring surface. Close to the plano-convex lens LI and facing the light-emitting-diode, a further aperture BL2 is provided, which ensures a small light beam diameter in the direct vicinity of the light transmitter LS.

Figure 3B:
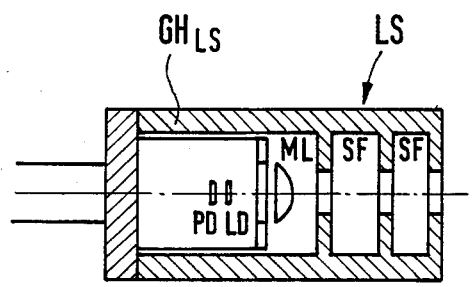
FIG. 3b is an enlarged schematic representation of another embodiment of a light transmitter according to the present invention.

As shown in FIG. 3b, a GaAlAs-CW-Laserdiode LD with an optically coupled photodiode PD is built into the light transmitter LS, which is in a cylindrical housing. The divergent beam generated by the Laserdiode LD is focused by a highly refracting microlens ML with a short focal length. Several aligned ray-trapping apertures SF in front of microlens ML reduce the passing of unwanted, unfocused rays, which are caused by dispersion of light on the lens surface. In the setup shown in FIG. 3b an almost parallel group of rays (with a divergence of approximately 1–2 m rad) having a very small diameter (0.5–1mm) is generated.

Some of the rays reflected from the surface OF or OF' must strike the light receiver to ensure that the angle of incidence can be measured. The aperture of the focusing lens or lens system should be as large as possible. In order to reduce the detection of unwanted light from the surroundings, an optical filter OPF is mounted between a biconvex lens or an error correcting lens system BIL and detector PSD, as clearly seen in FIG. 4.

Because position detectors PSD with very small active areas are used, lens systems with short focal lengths but large diameters are required in order to obtain a large measuring range. With conventional constructions it is difficult to produce sharp images of the light point on the detector surface within the measuring range. Therefore, the detector surface is placed at an angle $\beta$ to the optical axis OA which is less than 90°. The detector surface DOF of position detector PSD is so inclined to the optical axis OA of the lens system, that independent of the distance of the reflected light point a sharp image of the light point on the detector is achieved. The higher loss of reflection with an inclined detector must however be taken into consideration.

The optimal detector placement is calculated using the lens system parameters and the desired measuring range. The diameter LD of the lens system determines the light sensitivity of the light receiver LE and should be chosen as large as the dimensions of the housing of the range finder will allow. Preferably the position detector PSD is mechanically movable in the two directions indicated by the arrows in FIG. 4 so that the measuring range is adjustable within wide limits. The preferably used position detector PSD generates two currents from which the position of the light point on the detector can be determined, as described in detail below.

Figure 5:
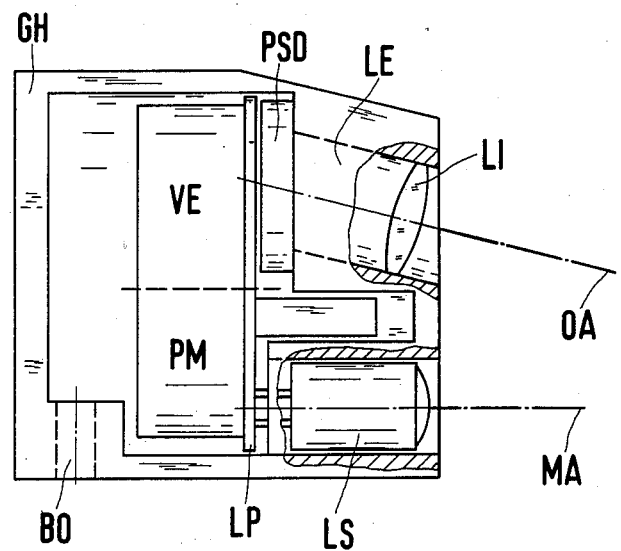
FIG. 5 is an enlarged schematic sectional view of a design-specification of an optical-electronic rangefinder according to the present invention.

In FIG. 5 there is shown an enlarged drawing of a design-specification of the proposed optical-electronic range finder having dimensions of approximately 35×35×14 mm. Mounted in a resistant housing GH made of aluminum is the light transmitter LS shown in FIG. 3a or 3b and the light receiver LE shown in FIG. 4. Through a suitable choice of lens system and of the size of the active area of the position detector PSD, a measuring range of approximately 30 to 500 mm is available.

In housing GH, in addition to the light transmitter LS and the light receiver LE, there is also an electronic circuit PM, described below, for the control of the Laserdiode LD in the light transmitter LS, and an amplifier circuit VE containing two fast operational amplifiers. The amplifier circuit VE transforms the currents from the position detector PSD into proportional voltages. To connect the range finder head to the signal conditioning unit a cable is passed through the opening BO at the rear of the housing.

Figure 6:
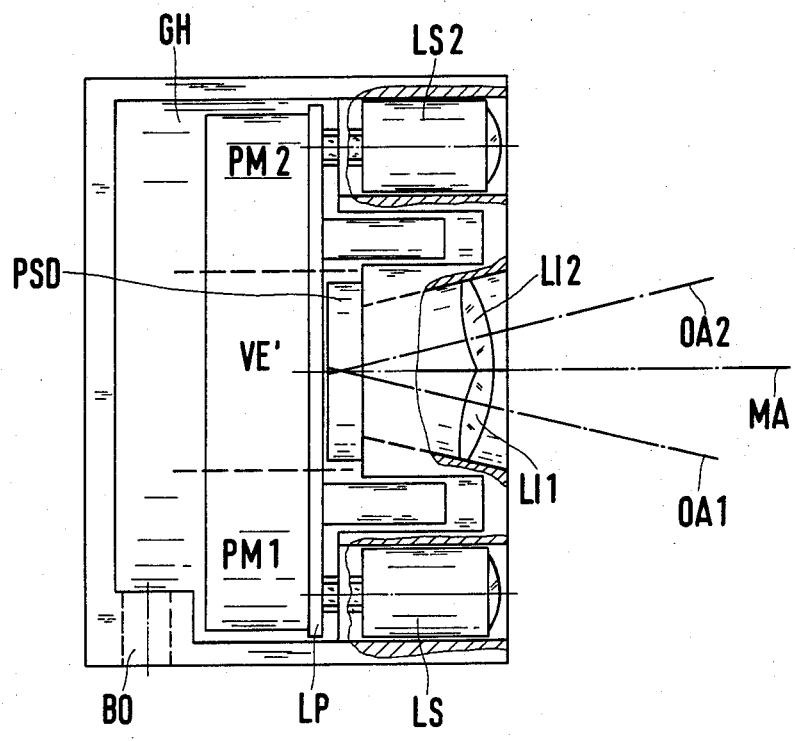
FIG. 6 is an enlarged schematic sectional view of the layout of two range finder systems according to the present invention enclosed in a single housing.

In FIG. 6 there is shown an enlarged drawing of two combined range finding systems. Two light transmitters LS1 and LS2 are arranged around one position detector PSD, to which two lenses LI1 and LI2 are aligned. The light transmitters LS1 and LS2 are positioned symmetrically about the middle axis MA of the position detector PSD. The two light transmitters LS1 and LS2, the position detector PSD with its two aligned lenses LI1 and LI2, the electronic control circuit for each light transmitter, PM1 and PM2, and also the amplifier circuit VE' for the position detector PSD are all mounted on a single printed circuit board LP and housed together in one aluminum body GH'. To connect the double range finder head to the signal conditioning unit a cable is passed through opening BO in the rear of the housing.

The range finder shown in FIG. 6 contains two parallel range finder systems, making it possible to determine the angle and the distance to any given surface. For this purpose the range finder or sensor shown in FIG. 5 only needs to be equipped with an additional light transmitter (LS1 or LS2) and a related electronic control circuit (PM1 or PM2). A prototype of the housing GH' represented in FIG. 6, containing a sensor with two measuring beams, has dimensions of 50×35×17 mm. This can easily be built into the gripping mechanism of a robot.

Figure 7:
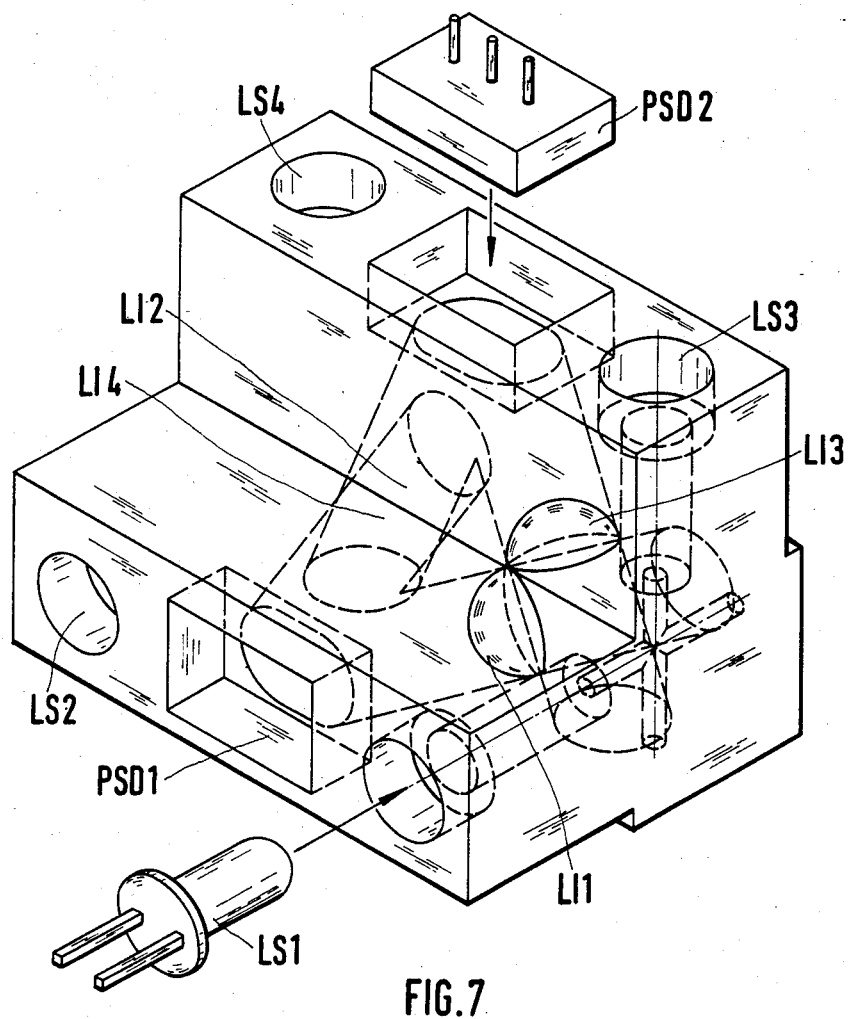
FIG. 7 is an enlarged schematic view in perspective of two double range finder systems, as in FIG. 6, arranged at 90° to one another.

In FIG. 7 two double range finder systems are arranged at an angle of 90° to each other resulting in the interlocking of the light-paths from the light transmitters LS1 to LS4 to the light receiver containing PSD1 and PSD2 via the respective lens systems. To simplify the diagram only the light receiver containing PSD2 and the light transmitter LS1 are shown as plug-in parts. Identical plug-in parts are used for the remaining light transmitters LS2 to LS4 and the light receiver containing PSD1.

The arrangement of FIG. 7 was developed for a measuring range of 0 to 25 mm for integration into the gripping mechanism of a robot. This narrow measuring range allows the omission of the plano-convex lenses in the light transmitters LS1 to LS4.

The entire electronics for controlling the light transmitters LS1 to LS4 and the corresponding operational amplifiers can also be built into the gripping mechanism.

When such a range finding system as shown in FIG. 7 is built into both gripping mechanisms of the robot a total of eight measuring beams can be used to determine distances. This enables a robot without computer vision to be so controlled as to grasp objects very quickly and accurately. In addition, problems of obscured vision are avoided since the sensors are integrated into the robot's moving gripper.

The dimensions of a prototype of the optical range finder system with four measuring beams are 19×19×28 mm. A complete gripping mechanism or finger can then be assembled with dimensions of approximately 60×37×30 mm.

Figure 9:
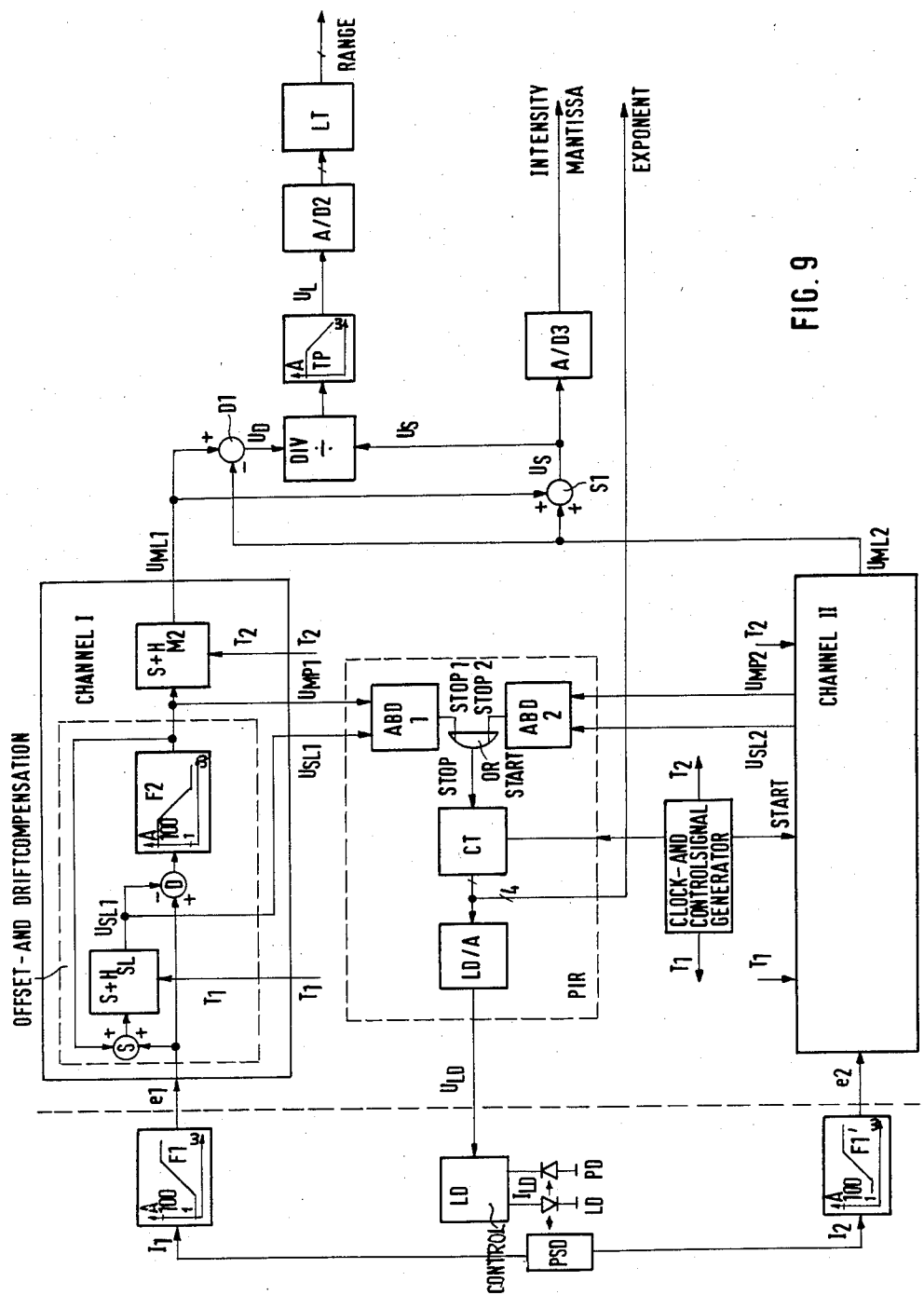
FIG. 9 is a functional block diagram of the electronic signal conditioning for the optical-electronic rangefinder according to the present invention.

Since the principle, the design and the quality of the signal conditioning determine the maximum obtainable scope of application and achievable accuracy of measurement of the proposed optical-electronic range finder, the complete signal conditioning is described, up to the generation of the digital range value, in the functional block diagram of FIG. 9. The system works with a pulsed light transmitter to ensure that light from the light transmitter, hereafter called measuring light ML, can be distinguished in the light receiver from light coming from the surroundings into the position detector PSD, hereafter called interference-light SL.

A pulsed operation of CW-Laserdiodes in a broad power range causes many difficulties because the performance curve is highly temperature dependent. This curve shows a high nonlinearity at the point at which the diode begins to emit coherent light. Below this point the Laserdiode functions like a light-emitting-diode. Since, however, the Laserdiode should be controlled with a power ratio of at least 1:1000, but the Laser-operation only has a power ratio of about 1:10, a highly dynamic control circuit, stable under all operating conditions, is necessary.

The emitted light power from the Laserdiode is measured with the built in photodiode PD, and then the Laserdiode current regulated so that the power of the light pulses are linearly dependent on the pulsed control-voltage $U_{LD}$. Using this control circuit the diode current is regulated so quickly that the light power is adjusted within approximately 5μ seconds to its temperature-independent value.

Figure 8:
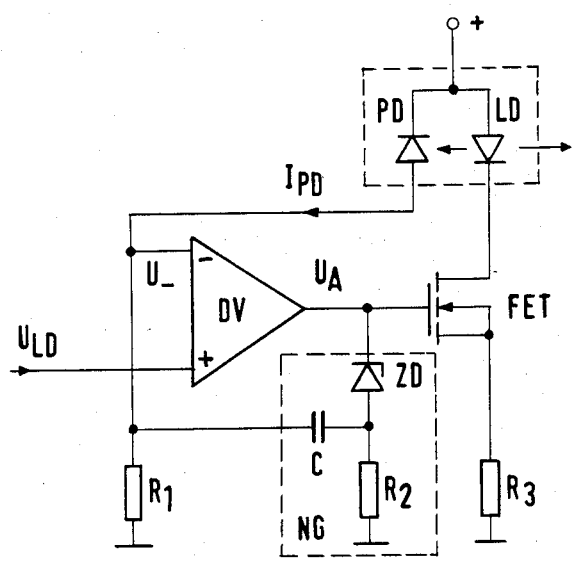
FIG. 8 is a schematic representation of the circuit diagram of the electronic control of the Laser diode of the light transmitter.

The design and operation of such a control circuit is described with reference to FIG. 8. The control-voltage $U_{LD}$ mentioned above is fed to the positive input of a quick operational amplifier DV, which is used to control the gate of a field-effect-transistor FET, which in turn regulates the current flow through Laserdiode LD. A current $I_{PD}$, which flows through photodiode PD, varies proportionally with the light power generated and emitted by the Laserdiode. This current $I_{PD}$ causes, at a resistor $R_1$, a voltage $U_-$ which is fed to the negative input of operational amplifier DV. In this way the control loop is closed.

The operational amplifier DV subtracts the voltage $U_-$ from the control-voltage $U_{LD}$ so that as the voltage $U_-$ increases, the output voltage $U_A$ of the operational amplifier, which controls the gate of the FET, decreases. This causes a decrease in the current flowing through the Laserdiode LD, a decrease in the emitted light power and a decrease in the photodiode PD current $I_{PD}$. The result is that the voltage $U_-$ also decreases. This cycle continues until a stationary condition $U_{LD}=U_-$ is reached.

It is not possible to design the above-mentioned control circuit, for pulsed operation within a broad power range of the Laserdiode, so that it works with short transient times at low power but without overshooting or oscillating at high power, which would quickly destroy the Laserdiode. A stable operation is achieved through the inclusion of a nonlinear functioning feedback circuit NG, shown in the dotted frame of FIG. 8. The feedback circuit uses a Zenerdiode ZD as a nonlinear element as well as a resistor $R_Z$ and a capacitor C.

The feedback circuit serves two purposes in the control loop, dependent upon whether the output voltage $U_A$ from the operational amplifier DV is lower or higher than the zenervoltage $U_{ZD}$ of Zenerdiode ZD:

1. If the output voltage $U_A$ is less than the zenervoltage $U_{ZD}$ (i.e. $U_A < U_{ZD}$), capacitor C connected in series with resistor $R_Z$ is parallel to resistor $R_1$, the resistance of $R_2$ is considerably less than that of $R_1$ (i.e. $R_Z < < R_1$). Quick variations of the Laserdiode control-voltage $U_{LD}$ cause a quicker variation of the operational amplifier output voltage $U_A$ than would occur without the inclusion of the feedback circuit, because the loop gain is increased at higher frequencies.

2. If output voltage $U_A$ is greater than zenervoltage $U_{ZD}$ (i.e. $U_A > U_{ZD}$), the Zenerdiode avalanches, so that variations in the operational amplifier's output voltage $U_A$ act immediately through the capacitor on voltage $U_-$, causing a reduction in the loop gain at high frequencies. Thereby an overshooting of the operational amplifier's output voltage and thus the Laserdiode's current is prevented.

As previously mentioned, a so called position sensitive detector PSD is used to measure the position of the light spot on object surface OF or OF'. The detector then generates two currents by which the position of the light point on the detector is determined. These electrical currents are transformed into voltages $e_1$ and $e_2$ by corresponding transimpedance-amplifiers integrated into the measuring head, thus allowing signal transmission via cable for further processing. The transimpedance-amplifiers might be overloaded because of interference light striking the PSD in spite of an optical filter, especially since the interference light intensity may be up to 100 times greater than the measuring light intensity reaching the light receiver LE. Therefore, the transimpedance-amplifiers are equipped with high-pass filters F1 and F1' (FIG. 9) which reduce the transformation of low frequency currents and boost the transformation of high frequency currents into proportional voltages. The impulse distortion of these filters is compensated by an inverse filter F2 (FIG. 9) within the signal conditioning unit. To avoid measuring errors, the transimpedance-amplifiers are designed to maintain exactly the same voltage at both detector terminals. A circuit diagram for the electronic signal conditioning unit is shown in FIG. 9.

The voltages $e_1$ and $e_2$ transformed by the transimpedance-amplifiers are processed in two separate channels I and II, resulting in two voltages $U_{ML1}$ and $U_{ML2}$ at the channel outputs for further processing. These voltages are free from any interference-light influence. The performace of channel I is described as follows: Channel I consists of three functional units, a so called sample-hold-block S&HSL for the interference-light voltage $U_{SLI}$, a filter F2 and a sample-hold-block S&HML for the measuring light voltage $U_{ML1}$. The sample-hold-blocks allow two operation modes. With the operation mode "sample" the input voltage is fed from the input to the output of the sample-hold-block whereas the operation mode "hold" maintains the output voltage at the level of the input voltage just before switching to the "hold" mode. The filter-characteristic of filter F2 is inverse to the filter F1 in the measuring head of the optical-electronic range finder. This ensures the regeneration of exactly the impulse shape at the filter output as emitted by the light transmitter LS.

The input voltage $e_1$ mentioned above is connected to sample-hold-block S&HSL for interference-light voltage $U_{SL1}$ via a sum amplifier S and to filter F2 via the positive input of a difference amplifier D. The negative input of difference amplifier D is connected to the output of sample-hold-block S&HSL. The output signal of filter F2 is connected to second sample-hold-block S&HML and is also fed back to sum amplifier S. This results in two different functions, depending on the operation mode of the sample-hold-block S&HSL:

First Function: With sample-hold-block S&HSL in the operation mode "sample", the voltage $e_1$ is fed to its output and therefore to both inputs of difference amplifier D. This causes in the ideal case a zero input voltage of filter F2.

In reality it will never be exactly zero because of offset and temperature drift effects in the difference amplifiers. Therefore, the error voltage is returned for automatic correction. The filter-characteristic of filter F2 causes these low frequency error voltages to be amplified and fed back from the filter output to the sum amplifier S. Thus, all errors are nullified in the operation mode "sample" of sample-hold-block S&HSL.

Second Function: Switching sample-hold-block S&HSL to the operation mode "hold" will cause it to store the present interference light related voltage and opens the error correcting loop. Light transmitter LS then emits a measuring light impulse and the voltage consisting of an interference light and a measuring light portion is applied to difference amplifier D. The difference amplifier subtracts the interference light portion as stored before in sample hold block S&HSL from the input signal $e_1$. Then the pure measuring light portion is fed through the impulse-former filter F2 to sample-hold-block S&HML, which is operated in the "sample" mode for tracking of the voltage $U_{ML1}$. Before the measuring light impulse ends, sample-hold-block S&HML is switched into the operation mode "hold".

Until the arrival of the next measuring light impulse, voltages $U_{ML1}$ and $U_{ML2}$ are held at the outputs of sample-hold-blocks S&HML of channel I and II. These voltages $U_{ML1}$ and $U_{ML2}$ are then processed as follows:

The intensity of a light transmitter's light impulse depends mainly on the optical characteristics of the relevant surface. To obtain reliable results, the measuring light intensity returned to the light receiver LE must exceed the background noise but not overload the amplifiers which would also make an evaluation impossible. In other similar arrangements a simple control loop is employed controlling the transmitter in such a way that the average reception level is maintained in the appropriate range (this can be achieved e.g. with an integrating-controller). It should be emphasized again that these statements can only be made on measuring systems using pulses and high measuring rates thus forcing the employment of short impulses.

All known and previously applied transmitter controls suffer from the great disadvantage of being unable to respond at once to quick changes of the reflection characteristics of the surface thus frequently giving measuring results outside the usable range. The measuring results are especially falsified when high measuring rates are required because filtering is then impossible. Simple control circuits for every single impulse are inadequate because the time constants within the control circuit especially caused by the position detector PSD make a proper impulse response impossible within the impulse duration of e.g. $20\mu$ seconds.

A digital/analog converter LD/A is therefore connected to a counting circuit e.g. a 4 bit counter CT in such a way that a staircase like voltage, i.e. laserdiode control voltage $U_{LD}$, is generated at the output of the digital/analog converter LD/A whose voltage step size is doubled at each step. Channels I and II have a level detector ABD attached that checks the level of the usable operation range of the amplifiers due to the interference-light intensity level.

When a certain level is reached at the output of the filter F2 the level detector ABD1 issues a stop-signal STOP1 which is used for control of the counter CT. STOP1 is logically ORed with STOP2 of the other channel. This yet constant level of the voltage $U_{LD}$ allows all signals to settle to their final value before the counter is reset to switch off the Laserdiode control voltage $U_{LD}$ to stop the light impulse. A complete pass of the staircase function takes about $8\mu$ seconds, still leaving another $12\mu$ seconds of settling time for the signal conditioning unit. The Laserdiode controller built into the measuring head of the optical-electronic range finder according to this invention, ensures that the Laserdiode LD emits exactly the light intensity proportional to the control voltage.

The voltage $U_L$ representing the position of a light point on the position detector PSD is determined by the voltages $U_{ML1}$ and $U_{ML2}$ at the output of the channels I and II through the simple mathematical equation $$U_L = (U_{ML1} - U_{ML2})/(U_{ML1} + U_{ML2})$$

The system's measuring accuracy depends on the quality of the technical realization of this quotient. Some systems operate on analog division units or apply both input voltages to a special analog/digital converter yielding the digital position value at its output. Both of these known systems suffer from the disadvantage, that low voltage levels will cause inaccurate position values.

The output voltages of the two channels $U_{ML1}$ and $U_{ML2}$ are fed to a sum amplifier S1 as well as to a difference amplifier D1. The output voltage $U_S$ from the sum amplifier and the output voltage $U_D$ from the difference amplifier are then transmitted to a division-unit DIV that processes the quotient via logarithmic operations thus allowing the evaluation of levels approximately 100 times smaller than in other systems. The permissible frequency range of the input voltages is considerably increased at the same time. The output voltage $U_L$ of the division-unit DIV is then filtered in low pass filter TP to suppress high frequency background noise. The position voltage is converted to a binary value by the analog/digital converter AD2. By means of a so called lookup-table LT each binary value, representing a light point position, is assigned another binary value indicating the distance.

The sum amplifier S1 is followed by another analog/digital converter AD3 yielding the binary value of the sum voltage $U_S$. In conjunction with the binary value obtained by the intensity control this produces simultaneously, measuring data for the reflection characteristics of the measured surface in a very wide range in the order of $1:10^6$.

The obtained binary values may be processed by a digital computer, not shown in the drawing.

While several embodiments of the present invention have been shown and described, it will be obvious that many changes and modifications may be made thereunto without departing from the spirit and scope of the invention.

What is claimed is:

1. A circuit arrangement for processing voltages on the output of a light transmitter of an optical-electronic rangefinder, said rangefinder including a light transmitter in the form of a CW laser diode transmitting a well focussed high intensity light beam, a light receiver having a position sensitive detector, the central axis of the light transmitter and the optical axis of the light receiver defining a predetermined acute angle therebetween, a pulse-electronic circuit for controlling the light transmitter and an amplifier circuit for transforming the currents received from the position detector into proportional voltages, said circuit arrangement comprising two high pass filters in two separate channels for converting the output currents of the position detector in the light receiver into measuring light voltages, said channels each having means for offset and drift compensation and an after-connected sample hold block, a dividing unit for dividing the difference of said measuring light voltages formed in a difference amplifier by the sum of said measuring light voltages formed in a sum amplifier, and a low-pass filter and an analog-digital converter for applying said quotient to a look-up chart, said look-up chart supplying the value of the range.

2. The circuit arrangement as defined in claim 1, wherein the output voltages of said high-pass filters are applied as input voltages of the means for offset and drift compensation on the one hand to a first input of a sum amplifier and a second sample hold block and on the other hand directly to a difference amplifier having its output in each channel applied to a filter inversed to said high-pass filters, the output of said filter being applied on he one hand to a second input of the sum amplifier and on the other hand to the after-connected sample hold block.

3. The circuit arrangement as defined in claim 1 which further comprises means for controlling the pulse intensity of the CW laser diode, said means including two level detectors, an OR-member, a 4-bit counter and a digital-analog converter, wherein the output voltages of the sample hold blocks and the filter output voltages of the means for offset and drift compensation are precessed further by the level detectors and the OR-member to the cycle-controlled counter and thereafter to the digital-analog converter to form a voltage for controlling the CW light-emitting diodes.

4. The circuit arrangement as defined in claim 1, wherein said light transmitter laser diode is optically coupled with a photodiode and has a highly refracting microlens with a short focal length as well as apertures afterconnected to the laser diode for focusing the divergent radiation transmitted by the laser diode and wherein the flow of current through the laser diode and proportionally thereto the current of the photodiode optically coupled with the laser diode is controlled by means of a circuit consisting of a difference amplifier and a field effect tansistor afterconnected to the amplifier so as to increase the range of output of the laser diode.

5. The circuit arrangement as defined in claim 4, wherein the output voltages of said high-pass filters are applied as input voltages of the means for offset and drift compensation on the one hand to a first input of a sum amplifier and a second sample hold block and on the other hand directly to a difference amplifier having its output in each channel applied to a filter inversed to said high-pass filters, the output of said filter being applied on the one hand to a second input of the sum amplifier and on the other hand to the after-connected sample hold block.

6. The circuit arrangement as defined in claim 4, which further comprises means for controlling the pulse intensity of the CW laser diode, said means including two level detectors, an OR-member, a 4-bit counter and a digital-analog converter, wherein the output voltages of the sample hold blocks and the filter output voltages of the means for offset and drift compensation are processed further by the level detectors and the OR-member to the cycle-controlled counter and thereafter to the digital-analog converter to form a voltage for controlling the CW light-emitting diodes.

7. An optical-electronic rangefinder adapted for mounting in the gripping arm of a robot, comprising:
a housing adapted to be integrated in the gripping arm of a robot;
two arrangements of two parallel rangefinding systems each are provided in said housing;
each of said two parallel rangefinding systems including a light transmitter having a light emitting diode and transmitting a well focused, high intensity light beam and having a pulse electronic circuit;
a light receiver associated with each of said two parallel rangefinding systems having a position-sensitive-detector disposed in said housing, each of said two parallel rangefinding systems being arranged symmetrically with respect to the central axis of the respective position-sensitive-detector;
two lens systems associated with each position-sensitive-detector, said lens systems being arranged with a corresponding angle relative to each other; and
an amplifier circuit disposed in said housing for transforming the currents received from the position-sensitive-detector of the light receiver of each arrangement into proportional voltages;
said two arrangements of two parallel rangefinding systems being disposed at right angles with respect to each other so that the paths of the rays of the light transmitters and of the light receivers are entwined with each other.

8. The optical-electronic rangefinder as defined in claim 1, wherein said light transmitters are GaAlAs-CW laser diodes optically coupled with photo diodes, and having a highly refracting microlens with a short focal length as well as apertures afterconnected to said laser diodes for focusing the divergent radiation transmitted by said laser diodes, and a circuit consisting of a difference amplifier and a field effect transistor afterconnected to said amplifier for controlling the flow of current through the laser diodes and proportionally thereto the current of the photo diodes optically coupled with said laser diodes in order to increase the range of output of the laser diodes.

9. The optical-electronic rangefinder as defined in claim 8, wherein a nonlinear counter coupling circuit is provided between the output of the difference amplifier and its negative input so as to stabilize the output of the laser diode.

10. The optical-electronic rangefinder as defined in claim 9 wherein in said counter coupling circuit, a Zener diode and a resistor are connected in series between the output of the difference amplifier and ground, and capacitor is connected between the connection between the Zener diode and the resistor and the negative input of the difference amplifier.

11. An optical-electronic rangefinder adapted for mounting in the gripping arm of a robot, comprising:
a housing adapted to be intergrated in the gripping arm of a robot;
two arrangements of two parallel rangefinding systems each are provided in said housing;
each of said two rangefinding systems comprising a laser diode as a light transmitter transmitting a well focused, high intensity light beam and having a pulse electronic circuit;
a light receiver associated with each of said two parallel rangefinding systems having a position-sensitive-detector disposed in said housing, each of said two parallel rangefinding systems being arranged symmetrically with respect to the central axis of the respective position-sensitive-detector;

two lens systems associated with each position-sensitive-detector, said lens systems being arranged with a corresponding angle relative to each other; and an amplifier circuit disposed in said housing for transforming the currents received from the position-sensitive-detector of the light receiver of each arrangement into proportional voltages;

said two arrangements of two parallel rangefinding systems being disposed at right angles with respect to each other so that the paths of the rays of the light transmitters and of the light receivers are entwined with each other.

12. The optical-electronic rangefinder as defined in claim 17, wherein said light transmitters are GaAlAs-CW laser diodes optically coupled with photo diodes, and having a highly refracting microlens with a short focal length as well as apertures afterconnected to said laser diodes for focusing the divergent radiation transmitted by said laser diodes, and a circuit consisting of a difference amplifier and a field effect transistor after-connected to said amplifier for controlling the flow of current through the laser diodes and proportionally thereto the current of the photo didoes optically coupled with said laser diodes in order to increase the range of output of the laser diodes.

13. The optical-electronic rangefinder as defined in claim 12, wherein a nonlinear counter coupling circuit is provided between the output of the difference amplifier and its negative input so as to stabilize the output of the laser diode.

14. The optical-electronic rangefinder as defined in claim 13, wherein in said counter coupling circuit, a Zener diode and a resistor are connected in series between the output of the difference amplifier and ground, and a capacitor is connected between the connection between the Zener diode and the resistor and the negative input of the difference amplifier.

* * * * *